(12) United States Patent
Bowley

(10) Patent No.: US 10,953,411 B2
(45) Date of Patent: Mar. 23, 2021

(54) MODULAR CYCLONE

(71) Applicant: ENERCORP SAND SOLUTIONS INC., Calgary (CA)

(72) Inventor: Ryan Thomas Bowley, Calgary (CA)

(73) Assignee: ENERCORP SAND SOLUTIONS INC., Calgary (CA)

( * ) Notice: Subject to any disclaimer, the term of this patent is extended or adjusted under 35 U.S.C. 154(b) by 0 days.

(21) Appl. No.: 16/446,165

(22) Filed: Jun. 19, 2019

(65) Prior Publication Data

US 2019/0388907 A1 Dec. 26, 2019

Related U.S. Application Data

(60) Provisional application No. 62/690,061, filed on Jun. 26, 2018.

(51) Int. Cl.
| | |
|---|---|
| *B04C 3/06* | (2006.01) |
| *B01D 45/12* | (2006.01) |
| *B04C 3/00* | (2006.01) |
| *B04C 9/00* | (2006.01) |

(52) U.S. Cl.
CPC ............... *B04C 3/06* (2013.01); *B01D 45/12* (2013.01); *B04C 2003/006* (2013.01); *B04C 2009/004* (2013.01)

(58) Field of Classification Search
CPC .......... B01D 45/12; B04C 5/103; B04C 5/185
See application file for complete search history.

(56) References Cited

U.S. PATENT DOCUMENTS

| | | | | |
|---|---|---|---|---|
| 3,456,789 | A * | 7/1969 | Phipps ................... | B03B 5/623 209/156 |
| 3,494,474 | A * | 2/1970 | Estabrook .............. | B04C 5/103 210/512.1 |
| 4,369,047 | A * | 1/1983 | Arscott .................... | B04C 5/04 95/243 |
| 2010/0267540 | A1* | 10/2010 | Babb ...................... | B01D 45/16 494/59 |
| 2011/0297605 | A1* | 12/2011 | Ross ...................... | B04C 5/085 210/232 |
| 2018/0050945 | A1* | 2/2018 | McDonald ............. | B01D 65/08 |
| 2018/0095011 | A1* | 4/2018 | Lewis-Gray ......... | G01N 1/2035 |

FOREIGN PATENT DOCUMENTS

| | | | | |
|---|---|---|---|---|
| WO | WO-2015162439 A1 * | 10/2015 | ......... | B01D 21/0003 |
| WO | WO-2016134403 A1 * | 9/2016 | ........... | G01N 1/2035 |
| WO | WO-2016153458 A1 * | 9/2016 | ........... | B01D 61/142 |

* cited by examiner

*Primary Examiner* — Bradley R Spies
(74) *Attorney, Agent, or Firm* — MH2 Technology Law Group LLP

(57) ABSTRACT

A cyclone separator includes a cyclone body having an inlet and an underflow outlet. The inlet is configured to receive a mixed fluid therethrough and into the cyclone body. An underflow is separated from the mixed fluid and directed to the underflow outlet. The cyclone separator also includes an inlet insert positioned in and coupled to the inlet, the inlet insert being configured to direct the mixed fluid generally tangent to an interior surface of the cyclone body, a cyclone insert positioned at least partially within the cyclone body, the cyclone insert including a conical cyclone, and a sand collection vessel coupled to the cyclone body and in communication with the underflow outlet. The underflow is directed to within the sand collection vessel when separated from the mixed fluid in the cyclone body.

21 Claims, 5 Drawing Sheets

MODULAR CYCLONE

CROSS-REFERENCE TO RELATED APPLICATIONS

This application claims priority to U.S. Provisional Patent Application Ser. No. 62/690,061, which was filed on Jun. 26, 2018, and is incorporated herein by reference in its entirety.

BACKGROUND

A cyclone is a device that is used to separate and remove particles from a fluid. In one example, the fluid may be from a well and have sand particles dispersed therein. The particles may be removed based on a ratio of their centripetal force to fluid resistance. The ratio may be high for dense and/or coarse particles, and low for light and/or fine particles.

The cyclone may need to be replaced with a different cyclone in response to one or more properties of the fluid changing. The properties may be, for example, flow rate, viscosity, particle size, particle concentration, and the like. However, replacing the cyclone every time the properties change may be time-consuming and expensive. Therefore, what is needed is an improved cyclone that may be modified, rather than replaced, when the properties of the fluid change.

SUMMARY

Embodiments of the disclosure may provide a cyclone separator that includes a cyclone body having an inlet and an underflow outlet. The inlet is configured to receive a mixed fluid therethrough and into the cyclone body. An underflow is separated from the mixed fluid and directed to the underflow outlet. The cyclone separator also includes an inlet insert positioned in and coupled to the inlet, the inlet insert being configured to direct the mixed fluid generally tangent to an interior surface of the cyclone body, a cyclone insert positioned at least partially within the cyclone body, the cyclone insert including a conical cyclone, and a sand collection vessel coupled to the cyclone body and in communication with the underflow outlet. The underflow is directed to within the sand collection vessel when separated from the mixed fluid in the cyclone body.

Embodiments of the disclosure may also provide a method for assembling a cyclone separator. The method includes determining a volumetric flow rate of fluid flowing out of a well, determining a target velocity of the fluid flowing through an inlet insert after the fluid flows out of the well, selecting the inlet insert based at least partially upon the volumetric flow rate of the fluid and the target velocity of the fluid, selecting a cyclone starter insert based at least partially upon a diameter of the inlet insert, selecting a cyclone insert based at least partially upon a viscosity of the fluid, and inserting the inlet insert, the cyclone starter insert, and the cyclone insert into a cyclone body.

Embodiments of the disclosure may further provide a cyclone separator including a cyclone body having an inlet and an underflow outlet. The inlet is configured to receive a mixed fluid therethrough and into the cyclone body. An underflow is separated from the mixed fluid and directed to the underflow outlet. The cyclone separator also includes an inlet insert positioned in and coupled to the inlet. The inlet insert is configured to direct the mixed fluid generally tangent to an interior surface of the cyclone body. The cyclone separator further includes a cyclone insert positioned at least partially within the cyclone body. The cyclone insert includes a conical cyclone section and a cyclone insert flange that is configured to be connected to a flange of the cyclone body so as to maintain a position of the cyclone insert relative to the cyclone body. The cyclone insert flange is configured to guide an angular orientation of the cyclone insert within and with respect to the cyclone body. The cyclone vessel further includes a sand collection vessel coupled to the cyclone body and in communication with the underflow outlet. The underflow is directed to within the sand collection vessel when separated from the mixed fluid in the cyclone body. The cyclone separator further includes a cyclone starter insert including a spiral surface, positioned at least partially within the cyclone body, aligned with the inlet insert, and configured to direct fluid from the inlet insert into a cyclonic flowpath. The cyclone separator also includes a sand hopper suspended in the sand collection vessel and configured to receive the underflow separated from the mixed fluid. The sand hopper is free from weight bearing engagement with the sand collection vessel within the sand collection vessel.

BRIEF DESCRIPTION OF THE DRAWINGS

The present disclosure may best be understood by referring to the following description and accompanying drawings that are used to illustrate embodiments of the invention. In the drawings.

DETAILED DESCRIPTION

Figure 2:
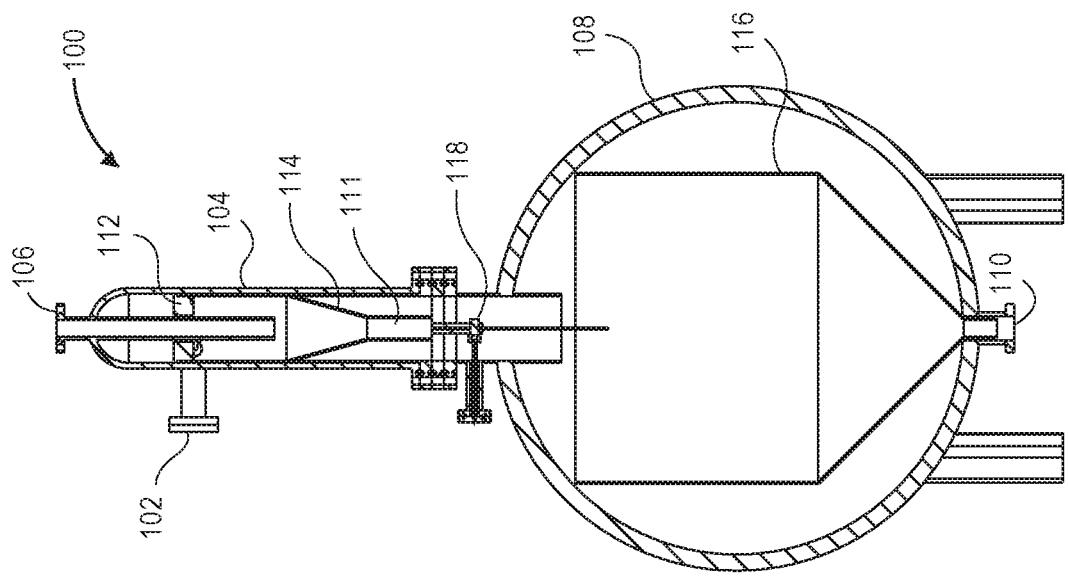
FIG. 2 illustrates a cross-sectional side view of the cyclone taken through line 2-2 in FIG. 1, according to an embodiment.

The following disclosure describes several embodiments for implementing different features, structures, or functions of the invention. Embodiments of components, arrangements, and configurations are described below to simplify the present disclosure; however, these embodiments are provided merely as examples and are not intended to limit the scope of the invention. Additionally, the present disclosure may repeat reference characters (e.g., numerals) and/or letters in the various embodiments and across the Figures provided herein. This repetition is for the purpose of simplicity and clarity and does not in itself dictate a relationship between the various embodiments and/or configurations discussed in the Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the embodiments presented below may be combined in any combination of ways, e.g., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. In addition, unless otherwise provided herein, "or" statements are intended to be non-exclusive; for example, the statement "A or B" should be considered to mean "A, B, or both A and B."

Figure 1:
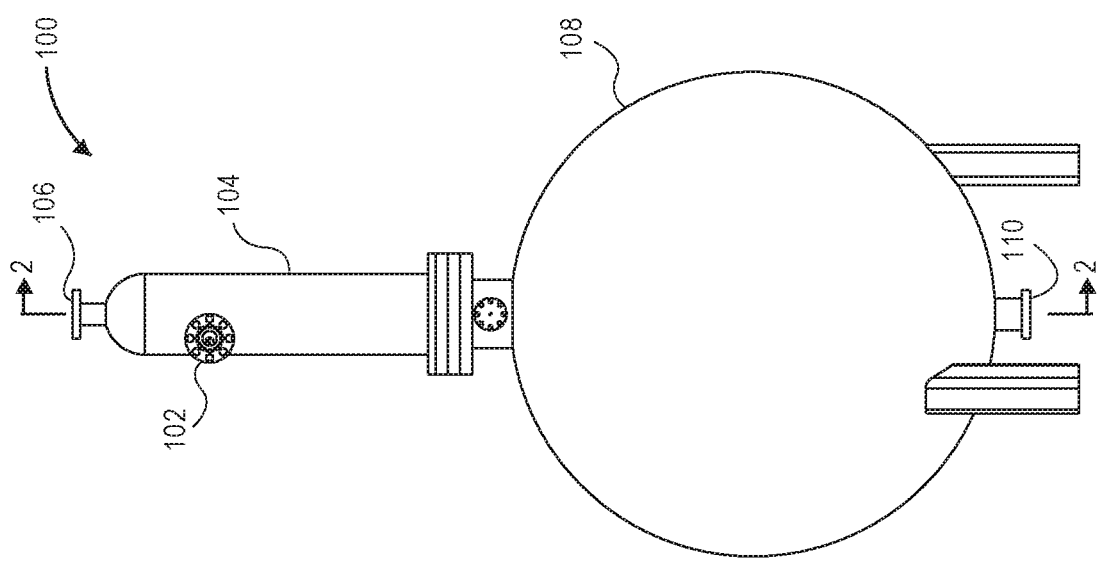
FIG. 1 illustrates a side view of a cyclone, according to an embodiment.

FIG. 1 illustrates a side view of a cyclone separator 100, according to an embodiment. The cyclone 100 may include an inlet 102 configured to receive a mixed fluid (e.g., a fluid containing two or more liquids or gases of different density, fluid containing liquids and solid particles, or some combination of the two). The cyclone 100 may also include a cyclone body (or "vessel") 104 that may define an internal volume (e.g., a hollow interior). As described in greater detail below, the mixed fluid may flow through the inlet 102 and into the cyclone body 104, and at least a portion of the particles may be separated/removed from the fluid in the cyclone body 104.

The cyclone 100 may also include an overflow or "fluid" outlet 106 through which the fluid may flow after at least a portion of the particles have been removed therefrom. If two gasses or fluids of different densities are being separated, the relatively lower density fluid may proceed through the overflow outlet 106.

The cyclone 100 may also include a sand collection vessel 108, which may be coupled with the cyclone body 104. After being separated from the mixed fluid, the underflow (e.g., separated solids or relatively denser fluids) may be received into the sand collection vessel 108, e.g., for storage therein, as will be described in greater detail below. The cyclone 100 may also include a blow-down nozzle 110, which may be connected to the sand collection vessel 108 proximal to a bottom thereof and may be used to evacuate or clean out the sand collected in the sand collection vessel 108.

FIG. 2 illustrates a cross-sectional side view of the cyclone 100 taken through line 2-2 in FIG. 1, according to an embodiment. As shown, the cyclone body 104 may include an underflow or "solids" outlet 111 through which the underflow that is separated from the mixed fluid may proceed. Further, a cyclone starter insert 112 may be positioned at least partially within the cyclone body 104 and proximate to and/or axially-aligned with the inlet 102. The cyclone starter insert 112 may have an aerodynamic surface that directs the mixed fluid stream to begin its helical flow path in the cyclone 100 and avoid or mitigate turbulent flow. In at least one embodiment, the cyclone starter insert 112 may be or include spiral surface.

A cyclone insert 114 may also be positioned at least partially within the cyclone body 104. The cyclone insert 114 may be positioned between the inlet 102 and the sand collection vessel 108, and may communicate therewith via the underflow outlet 111. The cyclone insert 114 may define the shape of various internal characteristics of the cyclone body 104 (e.g., the inner diameter, the length of the cylindrical section, the angle of the conical section or filtering section, the size of the underflow outlet 111, the placement of the vortex finder, etc.).

A sand hopper 116 may be positioned at least partially within the sand collection vessel 108. For example, the sand hopper 116 may be suspended in the sand collection vessel 108, and may not rest on the bottom of the sand collection vessel 108. In an embodiment, the sand hopper 116 may be suspended from a flange 140 positioned at the inlet of the sand collection vessel 108. The sand hopper 116 may be configured to receive the solids (or higher density fluids) that drop out of the underflow outlet 111. Suspending the sand hopper 116 may allow for a more direct measurement of the weight of the sand hopper 116, which may provide a more accurate measurement of the amount of sand (and/or fluid and/or other solids) that are contained in the sand hopper 116.

Figure 3:
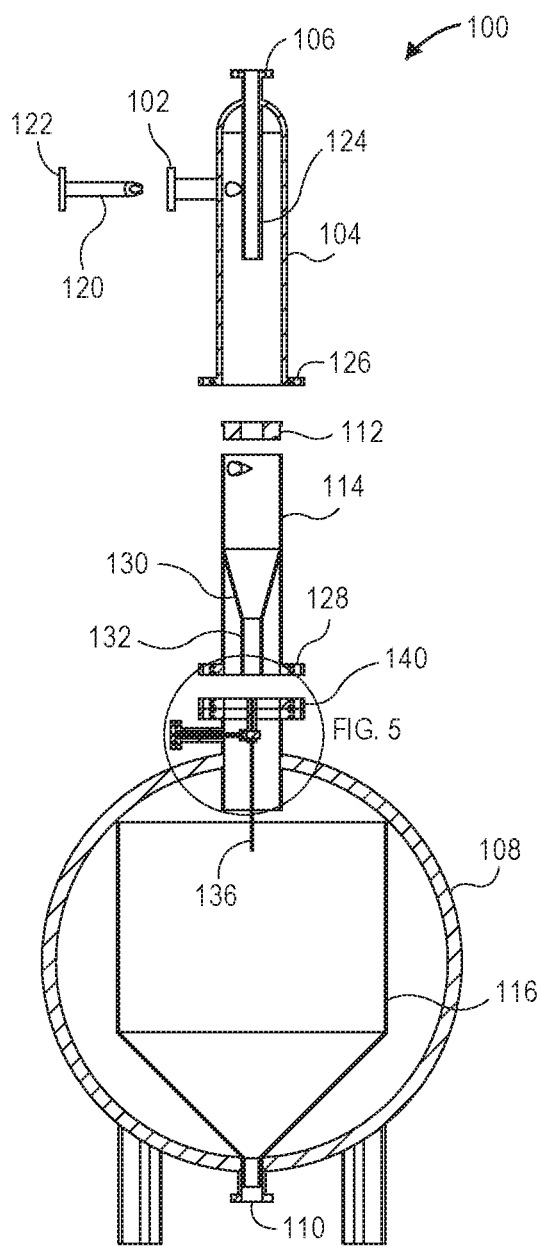
FIG. 3 illustrates an exploded cross-sectional side view of the cyclone shown in FIG. 2, according to an embodiment.

FIG. 3 illustrates an exploded cross-sectional side view of the cyclone 100 shown in FIG. 2, according to an embodiment. An inlet insert 120 may be configured to be inserted at least partially into the inlet 102. As described in greater detail below, the inlet insert 120 may have a tubular body with a bore formed at least partially axially therethrough. The inlet insert 120 may receive the fluid flow at the incoming large pipe diameter and converge the flowpath down to a predetermined inlet nozzle diameter, which may be eccentric to the pipe axis so as to align with the tangent of cyclone body 104. The inlet insert 120 may have a flange (e.g., a sandwich flange) 122 coupled to or integral with a distal end thereof to limit axial movement of the inlet insert 120 within the inlet 102. In at least one embodiment, the inserts (i.e., the cyclone starter insert 112, the cyclone insert 114, and/or the inlet insert 120) may be rigid and fixed in place, so that they do not move with respect to the remainder of the cyclone 100 (or any component thereof) during operation of the cyclone 100. The inlet insert 120 may be selected from a plurality of inserts having different sizes (e.g., diameter, axial length, etc.), depending on operating (e.g., well) conditions. Similarly, the cyclone starter insert 112 and/or the cyclone insert 114 may be changed/replaced (e.g., selected from a plurality of different inserts of the respective type) allows for modifications to the design if the well flow conditions change.

A cyclone overflow tube 124 may be positioned at least partially within the cyclone body 104. The cyclone overflow tube 124 may be in fluid communication with the overflow outlet 106. The cyclone overflow tube 124 may allow the cleaned fluid to exit the cyclone 100 via the overflow outlet 106.

As shown, the cyclone insert 114 may be configured to be inserted at least partially into the cyclone body 104. The cyclone starter insert 112 may be positioned at least partially within the cyclone body 104 and/or the cyclone insert 114. The cyclone body 104 may include a flange (e.g., a nozzle flange; RTJ style) 126 that may be configured to couple with a flange (e.g., a sandwich flange) 128 of the cyclone insert 114. The sand collection vessel 108 may include or be coupled to the flange 140, mentioned above. Thus, the flange 128 of the cyclone insert 114 may be sandwiched between two high pressure flanges 126, 140. As a result, the orientation and the features and datums of the cyclone starter insert 112 and/or cyclone insert 114 may be based off of the flange 128 itself, e.g., the flange 128 may be configured to guide the angular positioning of the cyclone insert 114. Thus, there may be no need for internal features on the cyclone body 104 to properly align or seal the cyclone insert 114. Alignment marks may be indicated on the cyclone body 104 and/or the flanges 126, 128, 140 to enable a user to visually confirm alignment.

A cyclone cone 130 may be positioned at least partially within and/or form a part of the cyclone insert 114. The cyclone cone 130 may take the primary vortex flow, which is large in diameter and travels in a downward direction, and reduce its diameter and send it upwards, making a secondary vortex spinning in the same direction and, e.g., concentric to the primary vortex flow, but traveling upward not downward. A diameter of the cyclone cone 130 may decrease proceeding downward. An underflow tube 132 may also be positioned at least partially within the cyclone insert 114, and may form part of the underflow outlet 111 (see FIG. 2). More particularly, the underflow tube 132 may be coupled to and/or in communication with a lower end of the cyclone cone 130.

The sand hopper 116 may be positioned at least partially within the sand collection vessel 108. For example, the sand hopper 116 may be suspended inside the sand collection vessel 108 and not otherwise provided with weight-bearing attachment to the sand collection vessel 108. In other words, the sand hopper 116 may be positioned within but not coupled directly to the sand collection vessel 108 in a structural manner. The sand hopper 116 may be hung from above, e.g., from the flange 140 via a line or another suspension assembly. As such, the weight of the sand hopper 116 may be measured, without consideration to the weight of the cyclone body 104 or components/contents thereof, and/or of the sand collection vessel 108.

For example, a first (e.g., male) hopper hanger clevis 136 may be positioned at least partially within the sand collection vessel 108 and/or the sand hopper 116. The first hopper hanger clevis 136 may be used to hang the sand hopper 116 from a second (e.g., female) load hanger clevis 146 (discussed below) using a load sensing pin. The devises 136, 146 may also be referred to as couplings.

In at least one embodiment, a diameter of a lower portion of the sand hopper 116 may decrease proceeding downward. A lowermost end of the sand hopper 116 may in communication with the blow-down nozzle 110.

Figure 4:
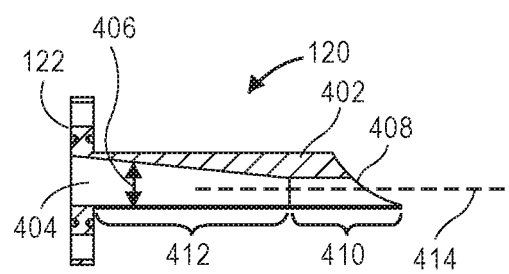
FIG. 4 illustrates an enlarged cross-sectional view of a portion of the cyclone shown in FIG. 3, according to an embodiment.

FIG. 4 illustrates an enlarged cross-sectional view of a portion of the cyclone 100, specifically the inlet insert 120, shown in FIG. 3, according to an embodiment. The inlet insert 120 may have a tubular body 402 having a bore 404 formed at least partially axially therethrough. In at least one embodiment, a diameter 406 of the bore 404 may remain substantially constant along a first axial portion 410 that is proximate to an inner end 408 of the inlet insert 120. The diameter of the bore 404 may then vary in a second axial portion 412 that is proximate to the flange 122. More particularly, the diameter of the bore 404 may increase in the second axial portion 412 proceeding toward the flange 122. In addition, the inner end 408 may not be perpendicular to a longitudinal centerline 414 through the body 402. Rather, a distance between the inner end 408 and the flange 122 may vary proceeding around a circumference of the inner end 408.

Figure 6:
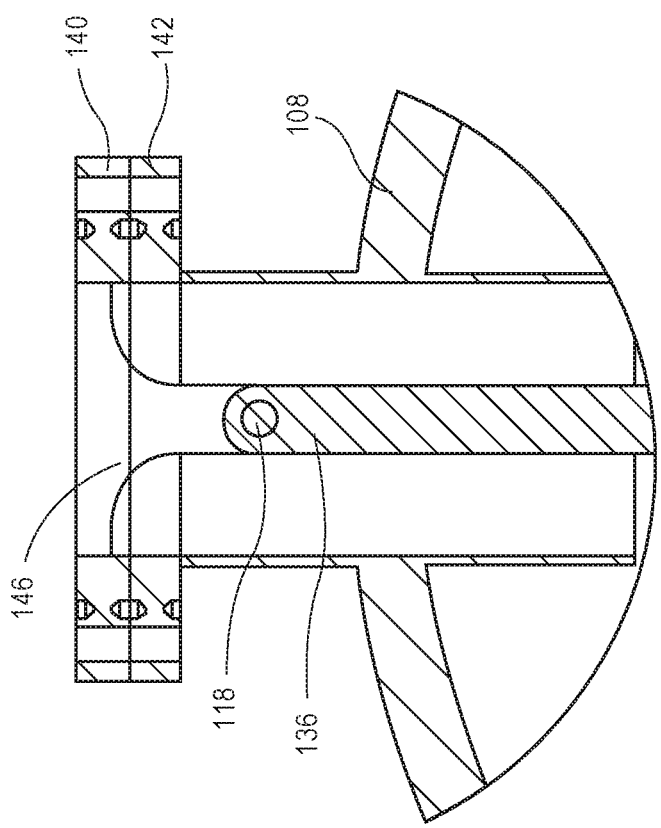
FIG. 6 illustrates an enlarged cross-sectional view of the portion of the cyclone shown in FIG. 5 after the cyclone has been rotated 90° back into the position shown in FIG. 1, according to an embodiment.
Figure 5:
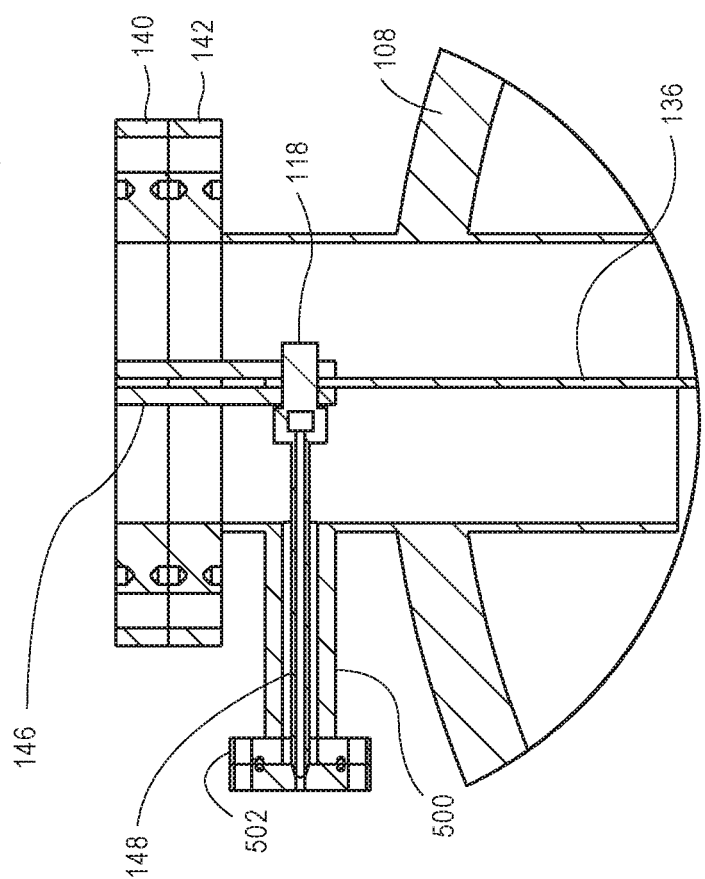
FIG. 5 illustrates an enlarged cross-sectional view of another portion of the cyclone shown in FIG. 3, according to an embodiment.

FIGS. 5 and 6 illustrate enlarged cross-sectional views of another portion of the cyclone 100 shown in FIG. 3, according to an embodiment. In this embodiment, FIGS. 5 and 6 are 90° offset from one another, with FIG. 5 being at the same angle as FIG. 3, and FIG. 6 being at the same angle as FIG. 1. The upper end of the sand collection vessel 108 may include or be coupled to the flange 140 that is configured to couple with the flange 128 of the cyclone insert 114. The flange 140 may be coupled to another flange 142, which may be a nozzle or RTJ style flange.

The first hopper hanger clevis 136 may extend at least partially through the flanges 140, 142. For example, the first hopper hanger clevis 136 may be connected to one of the flanges 140, 142. The first hopper hanger clevis 136 may also extend at least partially through a load pin (an example of a load cell) 118 and/or the second load hanger clevis 146. The hanging of the sand hopper 116 via the first and second hopper hanger devises 136, 146 (as compared to setting it on feet) may allow for loads on the sand hopper 116 to be applied to the load pin 118. The load pin 118 being located in-line with a nozzle 500 extending through the sand collection vessel 108 (as shown), the cyclone body 104, or both. Further, the load pin 118 may extend through the underflow path between the cyclone body 104 to the sand hopper 116, and may allow a piece of tubing to align with the load pin 118 and allows for assembly of a weight mechanism. A blank flange 502 on an end of the nozzle 500 may be used to allow an atmospheric pressure conduit to a sensor of the load pin 118. The load pin 118 may engage the clevis 136 and determine a tension therein, as generated by the weight of the sand hopper 116.

The sandwich flanges 122, 128, and/or 140 may be used for bleed rings and small instruments. The sandwich flanges 122, 128, and/or 140 may also be used to mount internal structures, such as the inlet insert 120, the cyclone insert 114, and the second load hanger clevis 146. Often the bleed rings and the like do not have a full flange with the holes, as they do not orientate any component to another component, but are pinched-in via the RTJ fitting.

Any type of load cell/load pin 118 may be used, e.g., to measure tension in the suspension assembly (in this case, the clevis 136) from which the sand hopper 116 is suspended. For example, the load pin 118 may have a high differential pressure cavity. A high-pressure tubing 148 may extend at least partially through the nozzle 500 and be coupled to and/or in communication with the load pin 118. The tubing 148 may be in communication with the atmosphere on one side (e.g., outside the cyclone 100) and to the high-differential pressure cavity on the other side.

Figure 7:
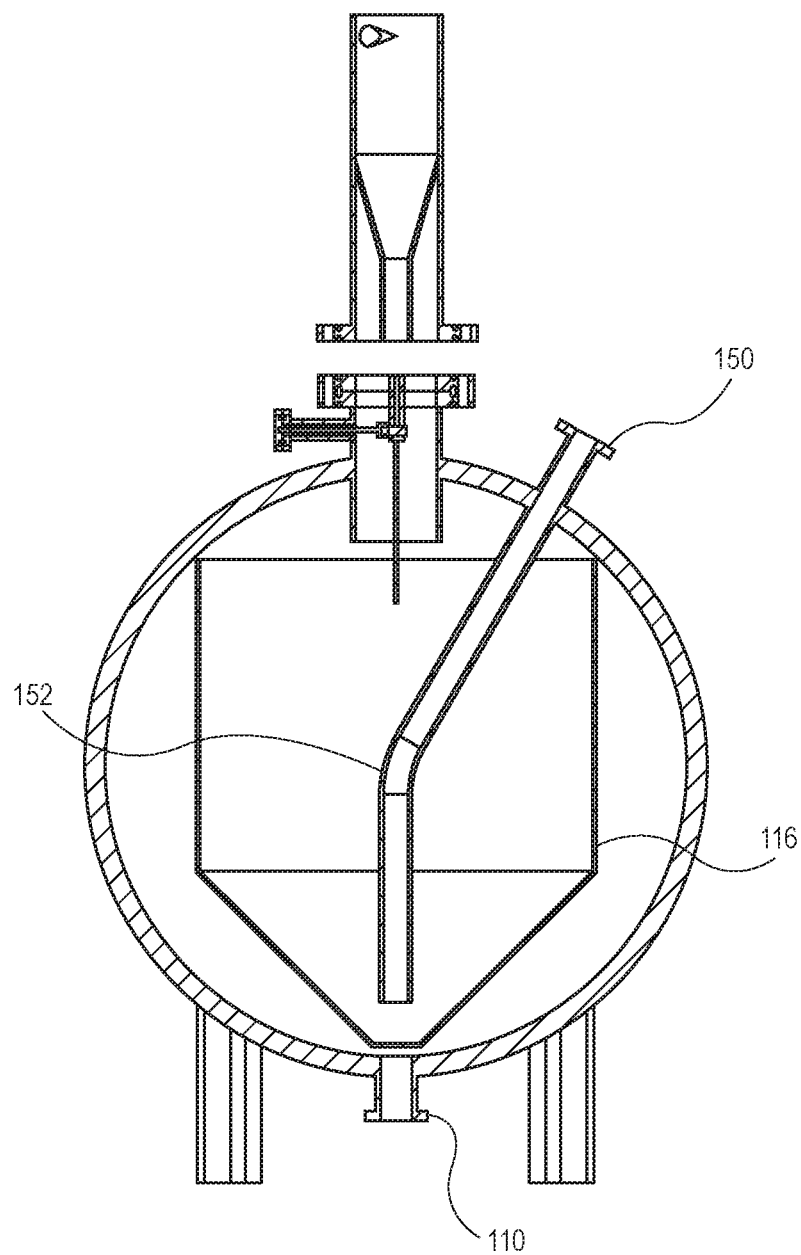
FIG. 7 illustrates a cross-sectional side view of the cyclone with an alternative hopper blow-down nozzle, according to an embodiment.

FIG. 7 illustrates a cross-sectional side view of the cyclone 100 with an alternative hopper blow-down nozzle 150, according to an embodiment. In this embodiment, the sand hopper 116 may not have an open drain at the bottom. Instead, it may have a tube 152 that reaches down to the bottom of the sand hopper 116 and sucks/vacuums out the particles (e.g., sand) in the bottom of the sand hopper 116. The blow-down nozzle 110 may remain present to clean out the sand collection vessel 108 (e.g., in the event that sand escapes the sand hopper 116. In this embodiment, a seal may be omitted.

Figure 8:
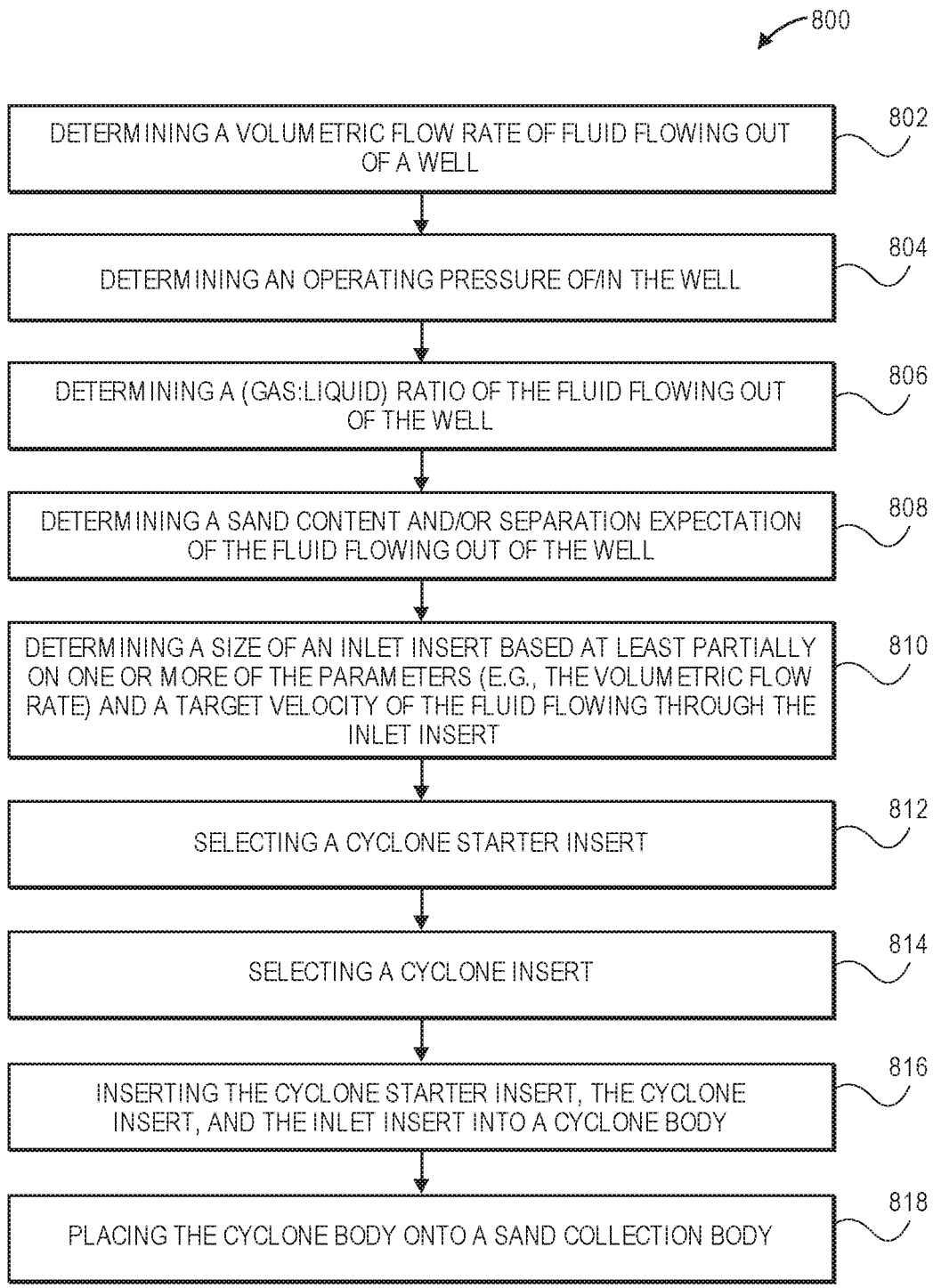
FIG. 8 illustrates a flowchart of a method for assembling (e.g., sizing) a cyclone, according to an embodiment.

FIG. 8 illustrates a flowchart of a method 800 for assembling (e.g., sizing) a cyclone 100, according to an embodiment. The method 800 may include determining (e.g., measuring) a volumetric flow rate of fluid flowing out of a well, as at 802. The method 800 may also or instead include determining (e.g., measuring) an operating pressure of the fluid in the well, as at 804. The method 800 may also or instead include determining (e.g., measuring) a (gas:liquid) ratio of the fluid flowing out of the well, as at 806. For example, the ratio may be 200,000 cubic feet per day (scfd) of gas and 5,000 barrels per day (bbpd) of oil that is API grade 50. The method 800 may also or instead include determining (e.g., measuring) a sand content and/or separation expectation (e.g., 100 microns) of the fluid flowing out of the well, as at 808.

Once one or more of the foregoing parameters are determined, the method 800 may include determining a size (e.g., exit diameter) of the inlet insert 120 based at least partially on one or more of the parameters (e.g., the volumetric flow rate) and a target velocity of the fluid flowing through the inlet insert 120, as at 810. For example, the user may select a target velocity of 65 ft/sec, and the size of the inlet insert 120 may be determined/selected such that it would cause the inlet velocity through the inlet insert 120 to be within a predetermined range (e.g., +/−5 ft/sec) of the target velocity (e.g., based at least partially upon the volumetric rate of the fluid flowing out of the well). As will be appreciated, 200,000 cfpd is much more voluminous at lower pressures, while the volume of the liquid generally does not vary with pressure.

A range of inlet inserts 120 may correspond to a cyclone body 104 with a particular size (e.g., diameter). For example, inlet inserts 120 from about 0.5 inches to about 1.5 inches may fit in a cyclone body 104 with an 8 inch diameter (e.g., because the cyclone body 104 has a 1.75 inch inlet 102). Thus, a 1.75 inch inlet insert 120 may be used in a larger cyclone body 104 having, for example, a 3 inch inlet 102. There may also be more than one height available for any given cyclone body diameter. In other words, each cyclone body 104 may have a short version and a tall version, which may accommodate cyclone inserts 114 of different sizes/lengths. Longer cyclone inserts 114 may have a longer dwell time that helps to separate sand depending on well conditions. A tall cyclone body 104 may be selected, not because there is more flow, but because the flow includes a higher liquid content or because the user wants to separate to a higher efficiency or lower particle size.

The method 800 may also include selecting a cyclone starter insert 112 based at least partially upon the size of the inlet insert 120, the location of the inlet insert hole, and the initial flowpath whether spiraling inwards or downwards primarily as a start, as at 812. The cyclone starter insert 112 may be inserted/assembled on top of the cyclone insert 114, and it may be secured before the cyclone insert 114 is inserted/assembled into the cyclone body 104. This may be used to determine whether the cyclone starter insert 112 works well for all sizes of inlet insert 120. If it does not, the cyclone starter insert 112 may be removed and replaced corresponding to even small changes in the size of the inlet 102.

The method 800 may also include selecting a cyclone insert 114 based at least partially upon the gas/oil/water volumetric percentages, the viscosity of the oil, and/or the size of the particle of sand targeted, as at 814. The cyclone insert 114 may have different lengths, cone dimensions, and/or angles to allow for longer or shorter dwell times (e.g., depending on the amount of fluid and its viscosity). For example, greater amounts of fluid and/or greater viscosity may require longer for the particles (e.g., sand) to separate therefrom. The inner diameter and cone dimensions may be changed to adapt to different well conditions and/or to improve cyclonic action.

The method 800 may also include inserting the cyclone starter insert 112, the cyclone insert 114, and the inlet insert 120 into the cyclone body 104, as at 816. The method 800 may also include placing the cyclone body 104 onto the sand collection vessel 108, as at 818. In at least one embodiment, a plurality of cyclone bodies 104 may be mounted/coupled to the top of a common sand collection vessel 108 (e.g., if a single cyclone body 104 cannot accommodate the entire flow). In another embodiment, several small cyclone bodies 104 may be selected, even if a single, larger cyclone body 104 can take the flow, but the smaller cyclone bodies 104 may offer higher efficiency or be able to remove smaller particles.

As used herein, the terms "inner" and "outer"; "up" and "down"; "upper" and "lower"; "upward" and "downward"; "above" and "below"; "inward" and "outward"; "uphole" and "downhole"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A cyclone separator, comprising:
    a cyclone body comprising an inlet and an underflow outlet, wherein the inlet is configured to receive a mixed fluid therethrough and into the cyclone body, wherein an underflow is separated from the mixed fluid and directed to the underflow outlet;
    an inlet insert positioned in and coupled to the inlet, wherein the inlet insert is configured to direct the mixed fluid generally tangent to an interior surface of the cyclone body;
    a cyclone insert positioned at least partially within the cyclone body, wherein the cyclone insert comprises a conical cyclone;
    a sand collection vessel coupled to the cyclone body and in communication with the underflow outlet, wherein the underflow is directed to within the sand collection vessel when separated from the mixed fluid in the cyclone body;
    a sand hopper positioned within the sand collection vessel and configured to receive the underflow separated from the mixed fluid; and
    a load cell configured to measure a weight of the sand hopper, so as to permit determining a weight of the underflow without weighing the sand collection vessel.

2. The cyclone separator of claim 1, further comprising a cyclone starter insert positioned at least partially within the cyclone body, aligned with the inlet insert, and configured to direct fluid from the inlet insert into a cyclonic flowpath in the cyclone body.

3. The cyclone separator of claim 2, wherein the cyclone starter insert comprises a spiraled surface.

4. The cyclone separator of claim 1, wherein the cyclone insert comprises a cyclone insert flange that is configured to be connected to a flange of the cyclone body so as to maintain a position of the cyclone insert relative to the cyclone body.

5. The cyclone separator of claim 4, wherein the cyclone insert flange is configured to guide an angular orientation of the cyclone insert within and with respect to the cyclone body.

6. The cyclone separator of claim 1, wherein the inlet insert has a first end defining a first diameter and second end defining a second diameter, the second diameter being smaller than the first diameter, and wherein the inlet insert is configured to receive the mixed fluid at the first end and provide the mixed fluid to within the cyclone body at the second end.

7. The cyclone separator of claim 1, wherein the sand hopper is suspended in the sand collection vessel from a top of the sand collection vessel.

8. The cyclone separator of claim 7, wherein the sand hopper is suspended within the sand collection vessel such that the sand hopper is not supported by an engagement with the sand collection vessel within the sand collection vessel.

9. A method for assembling a cyclone separator, comprising:
    determining a volumetric flow rate of fluid flowing out of a well;
    determining a target velocity of the fluid flowing through an inlet insert after the fluid flows out of the well;
    selecting the inlet insert based at least partially upon the volumetric flow rate of the fluid and the target velocity of the fluid;
    selecting a cyclone starter insert based at least partially upon a diameter of the inlet insert;
    selecting a cyclone insert based at least partially upon a viscosity of the fluid;
    inserting the inlet insert, the cyclone starter insert, and the cyclone insert into a cyclone body;
    positioning a sand hopper inside a sand collection vessel, wherein the sand hopper is in communication with the cyclone body via an underflow outlet of the cyclone body, such that the sand hopper is configured to receive an underflow from the underflow outlet; and
    connecting a load cell to the sand hopper and the sand collection vessel, wherein the load cell is configured to measure a weight of the sand hopper without measuring a weight of the sand collection vessel or a weight of the cyclone body.

10. The method of claim 9, further comprising determining an operating pressure of the fluid in the well, wherein the inlet insert is also selected based at least partially upon the operating pressure.

11. The method of claim 9, further comprising determining a gas-to-liquid ratio of the fluid flowing out of the well, wherein the inlet insert is also selected based at least partially upon the gas-to-liquid ratio.

12. The method of claim 9, further comprising determining a sand content of the fluid flowing out of the well, wherein the inlet insert is also selected based at least partially upon the sand content.

13. The method of claim 9, wherein the cyclone insert comprises a body having a bore formed axially therethrough, and wherein a diameter of the bore varies proceeding axially-through the bore.

14. The method of claim 9, wherein the cyclone body comprises a flange and wherein the cyclone insert comprises a flange, the method further comprising aligning the cyclone insert in the cyclone body by angularly aligning the flanges.

15. The method of claim 9, wherein positioning the sand hopper inside the sand collection vessel comprises suspending the sand hopper inside the sand collection vessel from a top of the sand hopper.

16. The method of claim 15, further comprising receiving the load cell through a nozzle in the cyclone body, the sand collection vessel, or both.

17. A cyclone separator, comprising:
    a cyclone body comprising an inlet and an underflow outlet, wherein the inlet is configured to receive a mixed fluid therethrough and into the cyclone body, and wherein an underflow is separated from the mixed fluid and directed to the underflow outlet;
    an inlet insert positioned in and coupled to the inlet, wherein the inlet insert is configured to direct the mixed fluid generally tangent to an interior surface of the cyclone body;
    a cyclone insert positioned at least partially within the cyclone body, wherein the cyclone insert comprises a conical cyclone section and a cyclone insert flange that is configured to be connected to a flange of the cyclone body so as to maintain a position of the cyclone insert relative to the cyclone body, and wherein the cyclone insert flange is configured to guide an angular orientation of the cyclone insert within and with respect to the cyclone body;
    a sand collection vessel coupled to the cyclone body and in communication with the underflow outlet, wherein the underflow is directed to within the sand collection vessel when separated from the mixed fluid in the cyclone body;
    a cyclone starter insert comprising a spiral surface, positioned at least partially within the cyclone body, aligned with the inlet insert, and configured to direct fluid from the inlet insert into a cyclonic flowpath;
    a sand hopper suspended and positioned entirely within the sand collection vessel and configured to receive an entirety of the underflow separated from the mixed fluid, wherein the sand hopper is free from weight bearing engagement with the sand collection vessel within the sand collection vessel; and
    a load cell coupled to the sand hopper and the sand collection vessel, the load cell being configured to measure a weight of the sand hopper without measuring a weight of the cyclone body or the sand collection vessel.

18. The cyclone separator of claim 17, wherein the sand hopper is suspended via a suspension assembly, and wherein the load cell is configured to measure a tension in the suspension assembly.

19. The cyclone separator of claim 1, wherein the sand hopper is suspended from a top flange of the sand collection vessel by a suspension assembly, wherein the load cell is part of the suspension assembly.

20. The cyclone separator of claim 19, wherein the cyclone insert comprises a flange, and the suspension assembly comprises a flange, wherein the flange of the suspension assembly is sandwiched between the top flange and the flange of the cyclone insert.

21. The cyclone separator of claim 1, further comprising a nozzle extending through the sand collection vessel and defining a pressure conduit providing access to the load cell.

\* \* \* \* \*